SAMUEL B. SHANK, OF MANOR TOWNSHIP, PENNSYLVANIA.

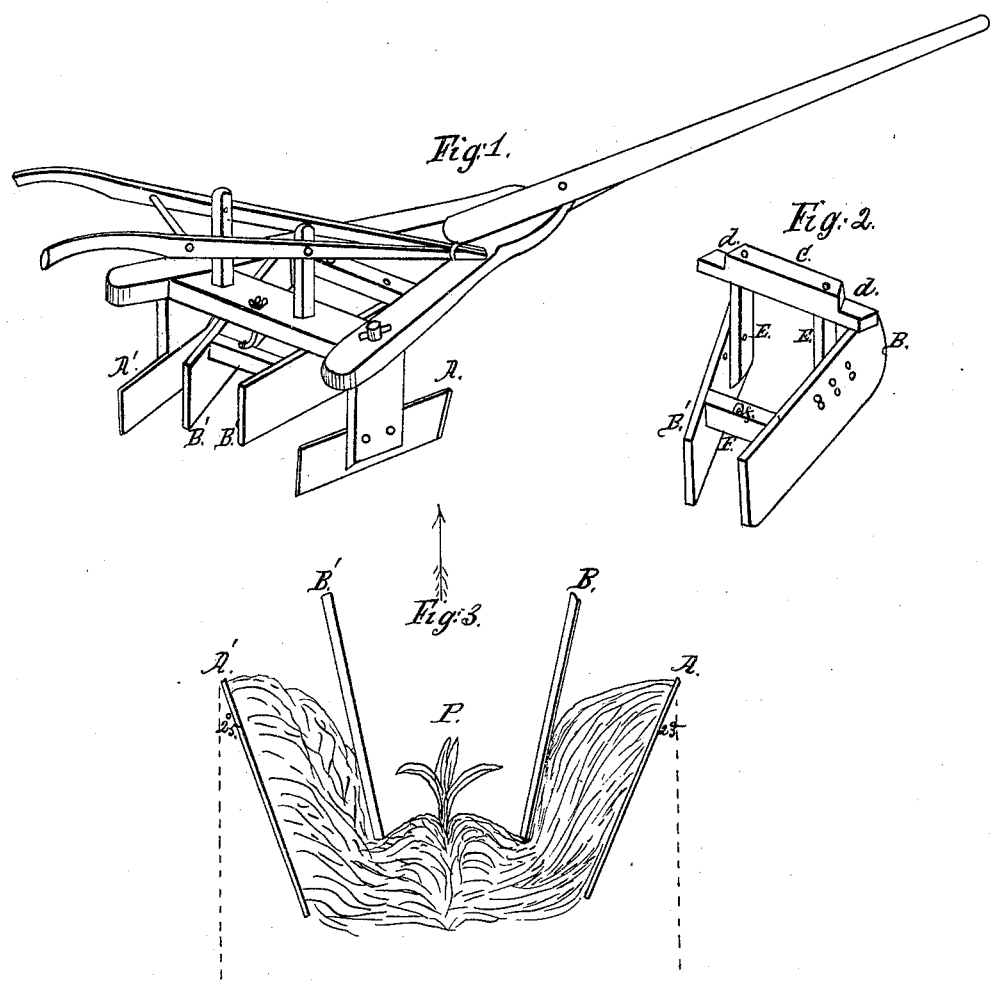

Letters Patent No. 85,968, dated January 19, 1869.

IMPROVEMENT IN CORN-CULTIVATOR.

The Schedule referred to in these Letters Patent and making part of the same.

*To all whom it may concern:*

Be it known that I, SAMUEL B. SHANK, of Manor township, in the county of Lancaster, and State of Pennsylvania, have made a new and useful Improvement on certain Corn-Cultivators, for protecting the plants, while dressing the same, which I call protecting-boards; and I do hereby declare that the following is a full description of the construction and operation of the same, reference being had to the accompanying drawings, making a part of this specification, in which—

Figure 1 shows my improvement attached to an ordinary Hearnley corn-plow or cultivator.

Figure 2, the same detached.

Figure 3 illustrates its operation.

The nature of my invention consists in providing a means to protect the young corn or plants from being covered up or crushed down with clods of soil while scraping or eradicating the grass from between the furrows, usually performed with the hoe in grassy fields, when the corn is small in the blade.

Farmers have experienced the want of a cultivator that will clean the land between the furrows, without at the same time throwing too much soil upon the plants, so much so as to require a person to follow after, to uncover the same, and raise them up, often bruised by heavy clogs of earth being thrown upon them.

In order to use these implements, and to prevent these results, I provide a device, shown by fig. 2, which consists of two boards, B B', rounded in front, sled-fashion, united by cross-pieces C F, flared outwards in front at an angle, say, of fifteen degrees.

E E are two uprights, connected to the anterior cross-piece, to which the boards B are connected by a pivot, e, made adjustable by two or more holes for the pivot-bolt. This sled-like combination is held behind by a link, slightly raised in front, has sufficient play to yield to slight undulations, and accommodate itself to the motions of the cultivator or plow.

The front cross-piece, C, is notched out on the projecting ends d, and these ends are inserted into a slot, cut out of the lower sides of the side-beams, and held in place by simply turning a prolonged button over the ends, which button is held by a pivot-bolt on the side of the slot.

To the rear cross-piece, a link with a screw-end is hooked, and held by a thumb-screw. By this or equivalent means the protector is easily attached or detached from the cultivator.

The operation illustrated by fig. 3 is such that while the long scrapers A A' scrape up the soil and weeds, it throws the same inwards against the protecting-boards B, accumulating and pressing against the boards until it reaches the terminus, when it gently falls inwards, and deposits the finer particles on both sides, at the base of the plants, leaving a sunken ridge, well adapted to convey the water directly to the roots of the plants, instead of allowing it to run to the middle, between the furrows, the heavier clods being left or prevented from crushing the plants.

My experience with this device last spring did not only surprise and delight me with its efficiency, but the neighboring farmers were astonished at the work it performed. No hoeing or other attention was required.

I am aware that so far as the construction of my device is concerned, it is simply a sled-fashioned appendage, but I am not aware that anything has ever been used substantially like it, in the manner and for the purpose specified; therefore,

What I claim as my invention, and desire to secure by Letters Patent, is—

The combination and arrangement of the protecting-boards B B', cross-pieces C F, and pieces E E, to which the boards A A' are connected, by pivots e, when constructed and applied substantially in the manner and for the purpose specified.

SAMUEL B. SHANK.

Witnesses:
WM. B. WILEY,
JACOB STAUFFER.